United States Patent
Seo et al.

(10) Patent No.: US 9,743,240 B2
(45) Date of Patent: Aug. 22, 2017

(54) METHOD FOR TRANSMITTING SIGNALS VIA DEVICE-TO-DEVICE LINK IN WIRELESS COMMUNICATION SYSTEM, AND APPARATUS THEREFOR

(71) Applicant: LG ELECTRONICS INC., Seoul (KR)

(72) Inventors: Hanbyul Seo, Seoul (KR); Hyukjin Chae, Seoul (KR); Hakseong Kim, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/906,865

(22) PCT Filed: Jul. 17, 2014

(86) PCT No.: PCT/KR2014/006492
§ 371 (c)(1),
(2) Date: Jan. 21, 2016

(87) PCT Pub. No.: WO2015/012534
PCT Pub. Date: Jan. 29, 2015

(65) Prior Publication Data
US 2016/0165398 A1 Jun. 9, 2016

Related U.S. Application Data

(60) Provisional application No. 61/857,210, filed on Jul. 22, 2013, provisional application No. 61/981,845, filed on Apr. 20, 2014.

(51) Int. Cl.
*H04B 7/00* (2006.01)
*H04W 4/02* (2009.01)
(Continued)

(52) U.S. Cl.
CPC ............. *H04W 4/023* (2013.01); *G01S 11/02* (2013.01); *H04W 56/0015* (2013.01);
(Continued)

(58) Field of Classification Search
None
See application file for complete search history.

(56) References Cited

U.S. PATENT DOCUMENTS 5,499,199 A 3/1996 Demas et al.
2006/0245398 A1 11/2006 Li et al.
(Continued)

FOREIGN PATENT DOCUMENTS

CN 1536925 A 10/2004
KR 10-2006-0113394 A 11/2006
(Continued)

OTHER PUBLICATIONS

Huawei, et al.: "Physical layer options for D2D discovery", R1-131864, 3GPP TSG RAN WG1 Meeting #73, Fukuoka, Japan, May 20-24, 2013.

*Primary Examiner* — Erika Washington
(74) *Attorney, Agent, or Firm* — Dentons US LLP

(57) ABSTRACT

Disclosed is a method for transmitting, by a user equipment (UE), signals via a device-to-device (D2D) link in a wireless communication system. Specifically, the method comprises the steps of: transmitting a control signal for the D2D link including a timing adjustment value for the D2D link based on a reference timing to a target UE without applying the timing adjustment value; and transmitting a data signal for the D2D link to the target UE with applying the timing adjustment value. Here, the timing adjustment value for the D2D link is same as a timing adjustment value for an uplink to a base station (BS).

12 Claims, 20 Drawing Sheets

(51) Int. Cl.
*G01S 11/02* (2010.01)
*H04W 64/00* (2009.01)
*H04W 56/00* (2009.01)
*H04W 76/02* (2009.01)

(52) U.S. Cl.
CPC ....... *H04W 56/0065* (2013.01); *H04W 64/00* (2013.01); *H04W 76/023* (2013.01)

(56) References Cited

U.S. PATENT DOCUMENTS

| | | | |
|---|---|---|---|
| 2012/0258706 A1* | 10/2012 | Yu | H04W 56/0045 455/426.1 |
| 2015/0036558 A1* | 2/2015 | Ko | H04L 5/1469 370/280 |
| 2015/0156757 A1* | 6/2015 | Kalhan | H04L 1/1607 370/330 |
| 2016/0044666 A1* | 2/2016 | Shin | H04W 76/023 370/336 |

FOREIGN PATENT DOCUMENTS

| | | |
|---|---|---|
| KR | 10-2007-0019433 A | 2/2007 |
| KR | 10-0808941 B1 | 3/2008 |
| KR | 10-2013-0063650 A | 6/2013 |
| RU | 2462834 C2 | 9/2012 |
| WO | 02065667 A1 | 8/2002 |
| WO | 2006052086 A2 | 5/2006 |
| WO | 2013/067686 A1 | 5/2013 |

\* cited by examiner

FIG. 2
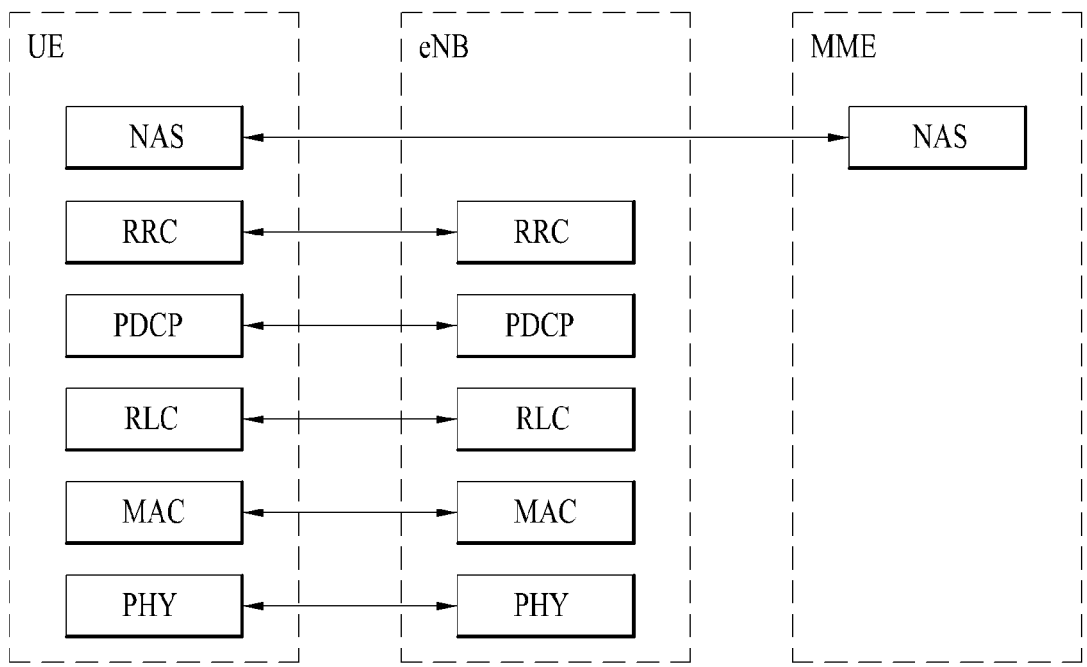
(a) Control-plane protocol stack
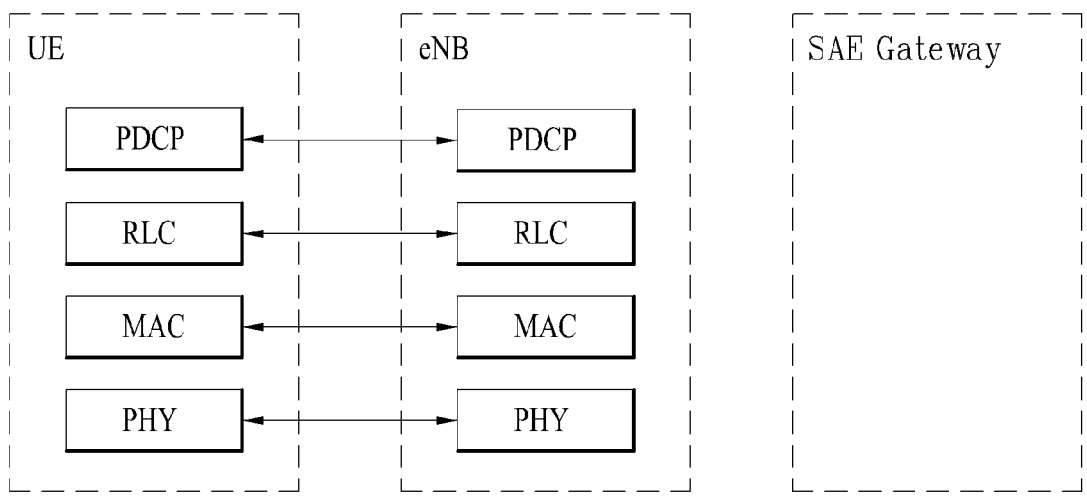
(b) User-plane protocol stack

METHOD FOR TRANSMITTING SIGNALS VIA DEVICE-TO-DEVICE LINK IN WIRELESS COMMUNICATION SYSTEM, AND APPARATUS THEREFOR

This application is a National Stage Application of International Application No. PCT/KR2014/006492, filed on Jul. 17, 2014, which claims the benefit of U.S. Provisional Application No. 61/857,210, filed on Jul. 22, 2013 and U.S. Provisional Application No. 61/981,845, filed on Apr. 20, 2014, all of which are hereby incorporated by reference in their entirety for all purposes as if fully set forth herein.

TECHNICAL FIELD

The present invention relates to a wireless communication system and, more specifically, to a method for measuring a distance between devices through direct device-to-device communication in a wireless communication system and an apparatus for the same.

BACKGROUND ART

As a representative example of a wireless communication system of the present invention, 3rd Generation Partnership Project Long Term Evolution (3GPP LTE) and LTE-Advanced (LTE-A) communication systems will hereinafter be described in detail.

FIG. 1 is a conceptual diagram illustrating an Evolved Universal Mobile Telecommunications System (E-UMTS) network structure as an exemplary mobile communication system. In particular, the Evolved Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)-related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

DISCLOSURE

Technical Problem

An object of the present invention devised to solve the problem lies in a method for measuring a distance between devices through direct device-to-device communication in a wireless communication system and an apparatus for the same.

Technical Solution

In an aspect of the present invention, a method for transmitting, by a UE, a signal for direct device-to-device (D2D) communication in a wireless communication system includes: receiving a downlink subframe from a reference eNB; transmitting a first signal to a counterpart UE on the basis of a boundary of the downlink subframe; and transmitting a second signal to the counterpart UE at a predetermined offset prior to the boundary of the downlink subframe.

In another aspect of the present invention, a UE performing D2D communication in a wireless communication system includes: a radio frequency (RF) communication module for transmitting/receiving a signal to/from a reference eNB or a counterpart UE of D2D communication; and a processor for processing the signal, wherein the processor is configured to control the RF communication module to transmit a first signal to the counterpart UE on the basis of a boundary of a downlink subframe received from the reference eNB and to transmit a second signal to the counterpart UE at a predetermined offset prior to the boundary of the downlink subframe.

The boundary of the downlink subframe may be delayed by propagation delay according to a distance to the reference eNB from when the reference eNB transmits the downlink subframe and received.

The first signal may include information about the offset. The offset may be set to a timing advance (TA) value for transmitting an uplink signal to the reference eNB. The UE may receive the information about the offset from an operation eNB.

The second signal may be delayed by propagation delay according to a distance to the counterpart UE from when the second signal is transmitted and received by the counterpart UE.

Advantageous Effects

According to embodiments of the present invention, it is possible to efficiently measure a distance between devices using direct device-to-device communication in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 illustrates a control plane and a user plane (U-Plane) of a radio interface protocol between a User Equipment (UE) and an E-UTRAN according to the 3GPP wireless access network standard.

BEST MODE

Figure 1:
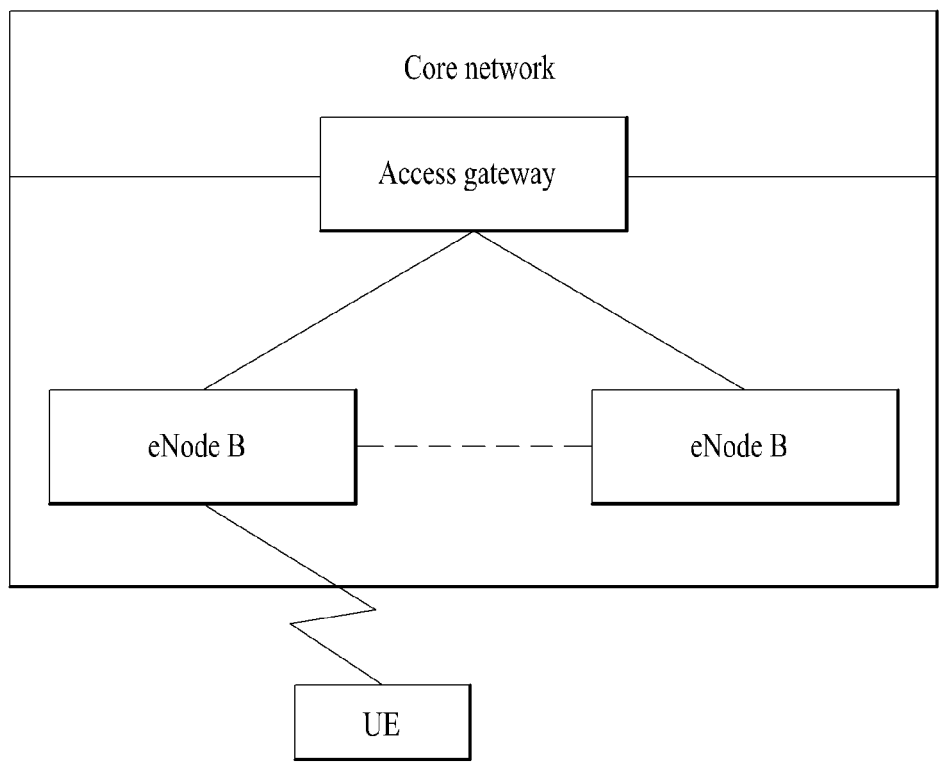
FIG. 1 is a conceptual diagram illustrating an Evolved Universal Mobile Telecommunications System (E-UMTS) network structure as an exemplary mobile communication system.

Reference will now be made in detail to the preferred embodiments of the present invention, examples of which are illustrated in the accompanying drawings. Wherever possible, the same reference numbers will be used throughout the drawings to refer to the same or like parts. The above and other configurations, operations, and features of the present invention will be easily understood from the embodiments of the invention described below with reference to the accompanying drawings. The embodiments described below are examples wherein technical features of the invention are applied to a 3rd Generation Partnership Project (3GPP) system.

Although the embodiment of the present invention will be disclosed on the basis of an LTE system and an LTE-A system for convenience of description and better understanding of the present invention, it should be noted that the scope or spirit of the present invention is not limited thereto and can be applied to other communication systems as necessary. In addition, although the embodiment of the present invention will be disclosed on the basis of an FDD scheme as an example, the scope or spirit of the embodiment of the present invention is not limited thereto and can also be applied to H-FDD and TDD schemes as necessary.

FIG. 2 illustrates a control plane and a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel. The RLC layer of the second layer enhances data transmission reliability. The functions of the RLC layer may also be implemented through internal functional blocks of the MAC layer. A PDCP layer of the second layer performs a header compression function to reduce unnecessary control information in order to efficiently transmit IP packets such as IPv4 or IPv6 packets over a radio interface with a relatively narrow bandwidth.

A Radio Resource Control (RRC) layer located at the lowest part of the third layer is defined only in the control plane and is responsible for control of logical, transport, and physical channels in association with configuration, re-configuration and release of Radio Bearers (RBs). The radio bearer (RB) is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB (eNode-B) is set to use a bandwidth such as 1.4, 3, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). In the meantime, uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 3:
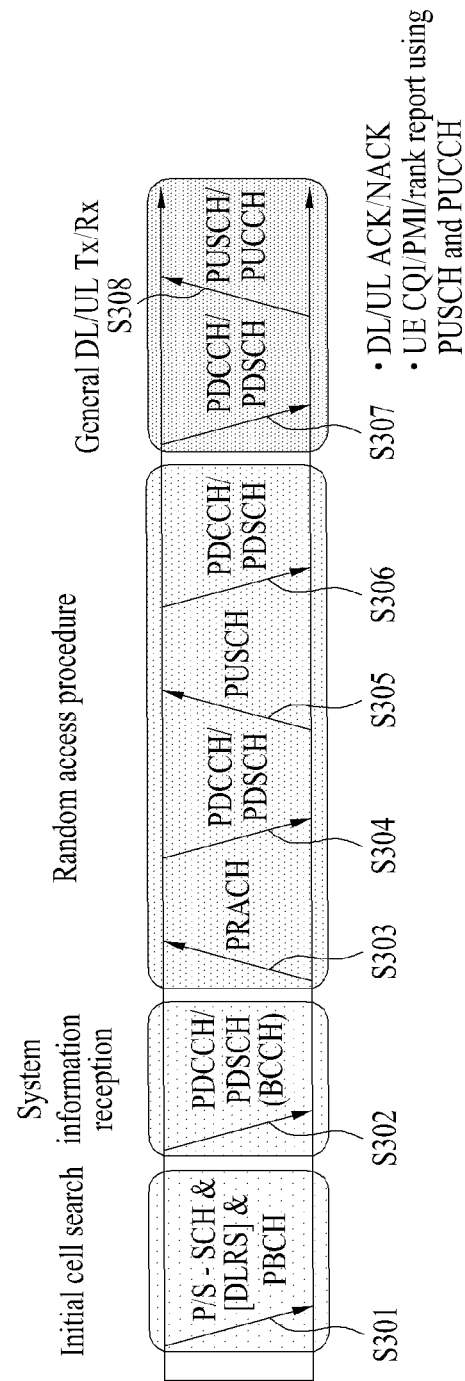
FIG. 3 is a conceptual diagram illustrating physical channels used in a 3GPP LTE system as an exemplary wireless communication system and a general method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S302.

On the other hand, if the UE initially accesses the BS or if the UE does not have radio resources for signal transmission, it may perform a random access procedure to the BS in steps S303 to S306. For the random access, the UE may transmit a predetermined sequence as a preamble to the BS on a Physical Random Access CHannel (PRACH) in steps (S303~S306) and receive a response message for the preamble on a PDCCH and a PDSCH corresponding to the PDCCH in steps S304 and S306. In the case of contention-based RACH, the UE may perform a contention resolution procedure.

After the foregoing procedure, the UE may receive a PDCCH and a PDSCH in step S307 and transmit a Physical Uplink Shared CHannel (PUSCH) and a Physical Uplink Control CHannel (PUCCH) in step S308, as a general downlink/uplink (DL/UL) signal transmission procedure. Specifically, the UE may receive downlink control information (DCI) through a PDCCH. In this case, DCI includes control information such as resource allocation information for the UE, and has different formats according to usage purposes.

On the other hand, uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 4:
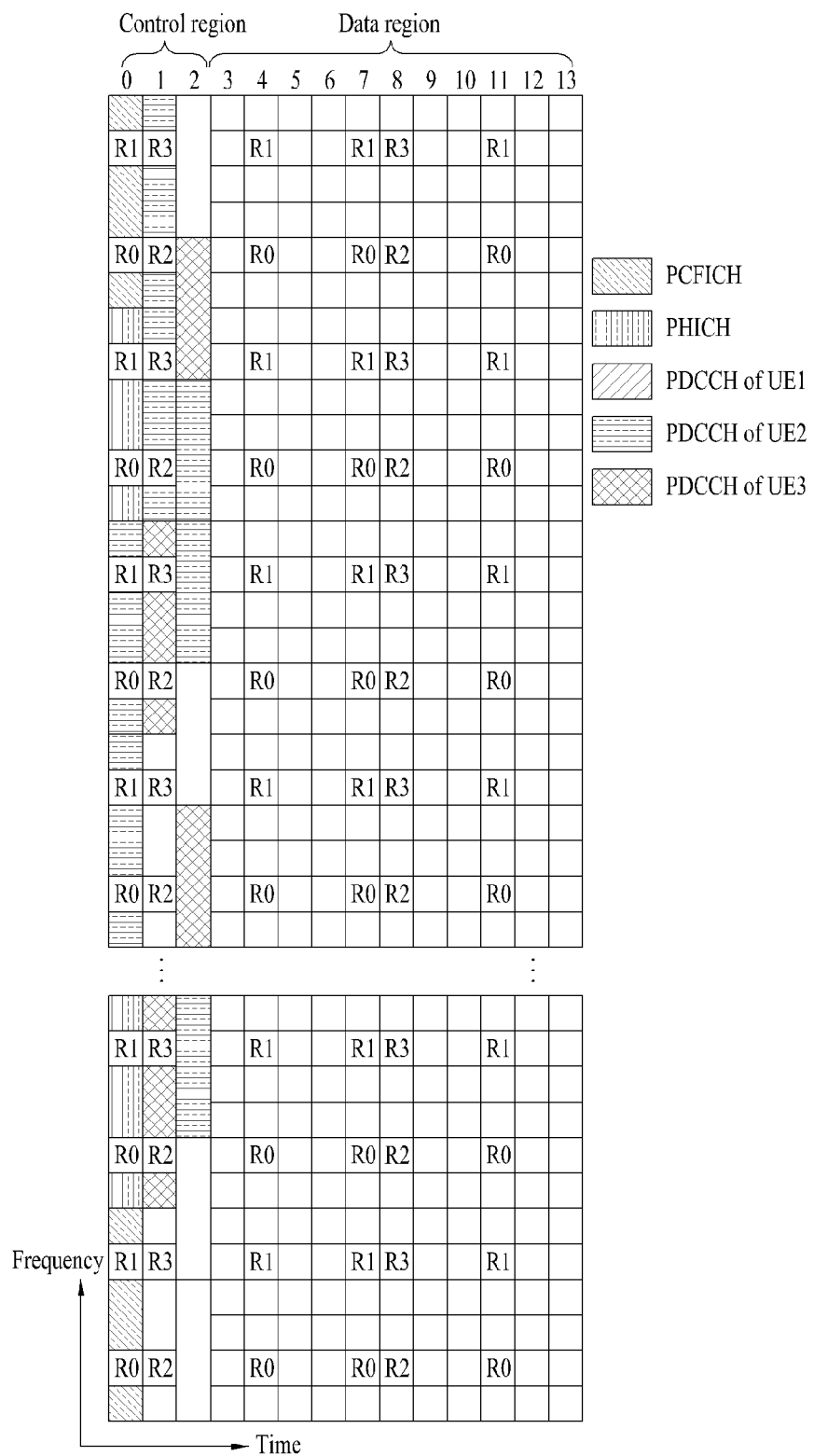
FIG. 4 is a conceptual diagram illustrating a downlink radio frame for use in an LTE system.

FIG. 4 shows a control channel contained in a control region of one subframe in a downlink radio frame according to one embodiment of the present invention.

Referring to FIG. 4, one subframe includes 14 OFDM symbols. First to third ones of the 14 OFDM symbols may be used as a control region, and the remaining OFDM symbols (i.e., 11 to 13 OFDM symbols) may be used as a data region. In FIG. 4, R1 to R4 represent reference signals (RSs) (also called pilot signals) of antennas 0 to 3, respectively. In a general subframe, RS s of the antennas 0 to 3 are fixed to a predetermined pattern irrespective of a control region and a data region. The control channel is allocated to a resource, to which the RS is not allocated, in the control region. A traffic channel is allocated to a resource, to which the RS is not allocated, in the data region. A variety of control channels may be allocated to the control region, for example, a physical control format indicator channel (PCFICH), a physical hybrid—ARQ indicator channel (PHICH), a physical downlink control channel (PDCCH), etc.

PCFICH is used as a physical control format indicator channel, and informs the UE of the number of OFDM symbols used for PDCCH at every subframe. PCFICH is located at a first OFDM symbol, and is established to have priority over PHICH and PDCCH. PCFICH includes 4 resource element groups (REGs), and individual REGs are distributed into the control region on the basis of a cell ID. One REG includes four REs. The RE is a minimum physical resource defined by 'one subcarrier×one OFDM symbol'. The PCFICH value indicates values of 1 to 3 or values of 2 to 4 according to bandwidth, and is QPSK (Quadrature Phase Shift Keying)—modulated.

PHICH is used as a physical HARQ (Hybrid-Automatic Repeat and reQuest) indicator channel, and carries HARQ ACK/NACK signals for uplink transmission. In other words, PHICH indicates a channel for transmitting DL ACK/NACK information for UL HARQ. The PHICH includes one REG, and is cell-specifically scrambled. An ACK/NACK signal indicated by one bit is BPSK (Binary Phase Shift Keying)-modulated. The modulated ACK/NACK is spread with a spreading factor (SF) of 2 or 4. Several PHICHs mapped to the same resources construct a PHICH group. The number of PHICHs multiplexed in the PHICH group may be determined according to the number of spreading codes. PHICH (or PHICH group) may be repeated three times so as to obtain a diversity gain from a frequency domain and/or a time domain.

PDCCH acting as a physical downlink control channel is allocated to N first OFDM symbols of a subframe. In this case, N is an integer of 1 or higher and is indicated by a PCFICH. PDCCH includes one or more CCEs. PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the BS and the UE may transmit and receive data other than either specific control information or specific service data through the PDSCH.

Information indicating which UE will receive data as an input, information indicating how the UEs receive PDSCH data, and information indicating whether decoding is carried out are contained in the PDCCH. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors a PDCCH using its own RNTI information. If at least one UE having the RNTI 'A' is present, the UEs receive PDCCH and receive PDSCH indicated by 'B' and 'C' through the received PDCCH information.

Figure 5:
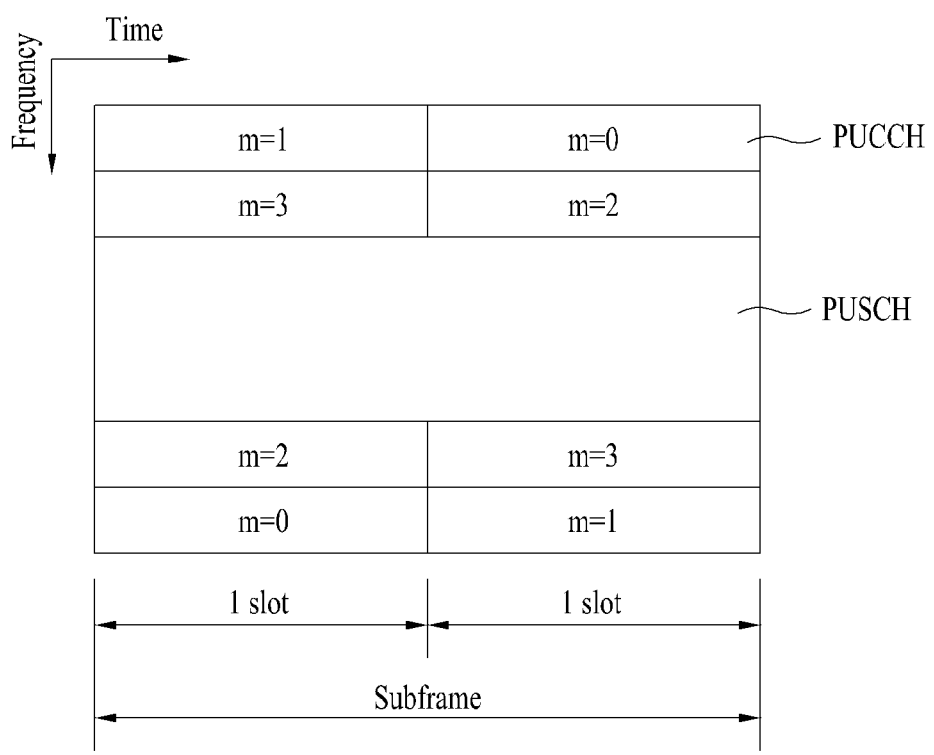
FIG. 5 is a conceptual diagram illustrating an uplink radio frame for use in an LTE system.

FIG. 5 illustrates a structure of a UL subframe in LTE.

Referring to FIG. 5, a UL subframe may be divided into a region to which a physical uplink control channel (PUCCH) carrying control information is allocated and a region to which a physical uplink shared channel (PUSCH) carrying user data is allocated. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, and a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
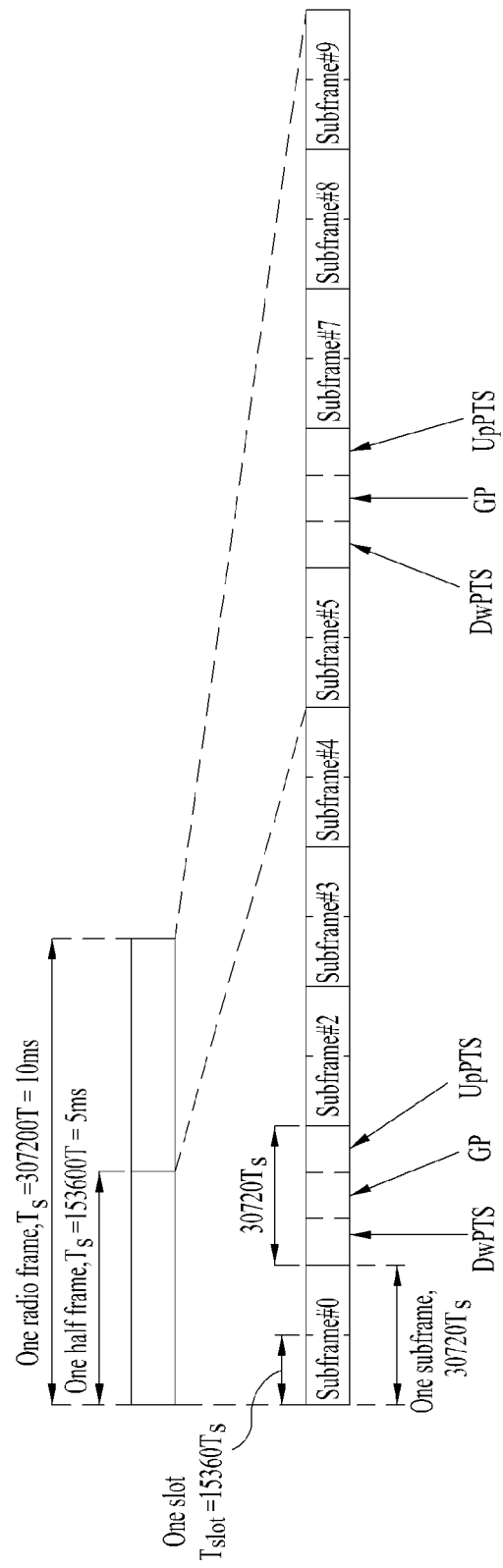
FIG. 6 is a diagram illustrating a structure of a radio frame for use in a Long Term Evolution (LTE) TDD system.

FIG. 6 is a diagram illustrating a structure of a radio frame for use in LTE TDD The radio frame for use in LTE TDD includes two half frames, each half frame including 4 subframes each having 2 slots and a special subframe having a Downlink Pilot Time Slot (DwPTS), a Guard Period (GP), and an Uplink Pilot Time Slot (UpPTS).

In the special subframe, DwPTS is used for initial cell search, synchronization, or channel estimation at a UE. UpPTS is used for an eNB to perform channel estimation and acquire UL synchronization with a UE. In other words, DwPTS is used for DL transmission, and UpPTS is used for UL transmission. Particularly, UpPTS is used for transmitting a PRACH preamble or a Sounding Reference Signal (SRS). The GP is used to cancel UL interference between UL and DL, caused by the multi-path delay of a DL signal.

UL/DL subframe configurations for LTE TDD are listed in Table 1 below.

TABLE 1

| Uplink-downlink Configuration | Downlink-to-Uplink Switch-point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents a DL subframe, U represents a UL subframe, and S represents a special subframe. Table 1 further tabulates DL-to-UL switching periodicities for the respective UL/DL subframe configurations in each system.

Figure 7:
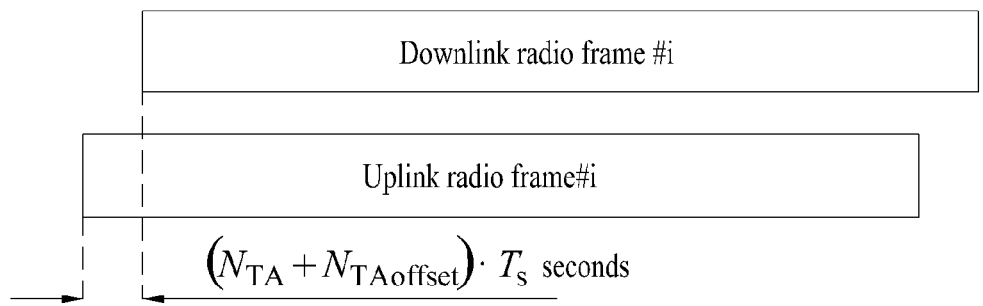
FIG. 7 illustrates timing of transmitting and receiving an uplink radio frame and a downlink radio frame in an LTE system.

FIG. 7 illustrates timing of transmitting and receiving an uplink radio frame and a downlink radio frame in an LTE system.

Referring to FIG. 7, transmission of uplink radio frame #i from a terminal, that is, a UE, is performed $(N_{TA}+N_{TAoffset}) \times T_s$ seconds $(0 \leq N_{TA} \leq 20512)$ in advance of the start of corresponding downlink radio frame #i. Here, $N_{TA\ offset}=0$ in frame structure type 1, that is, FDD, and $N_{TA\ offset}=624$ in frame structure type 2, that is, TDD.

Figure 8:
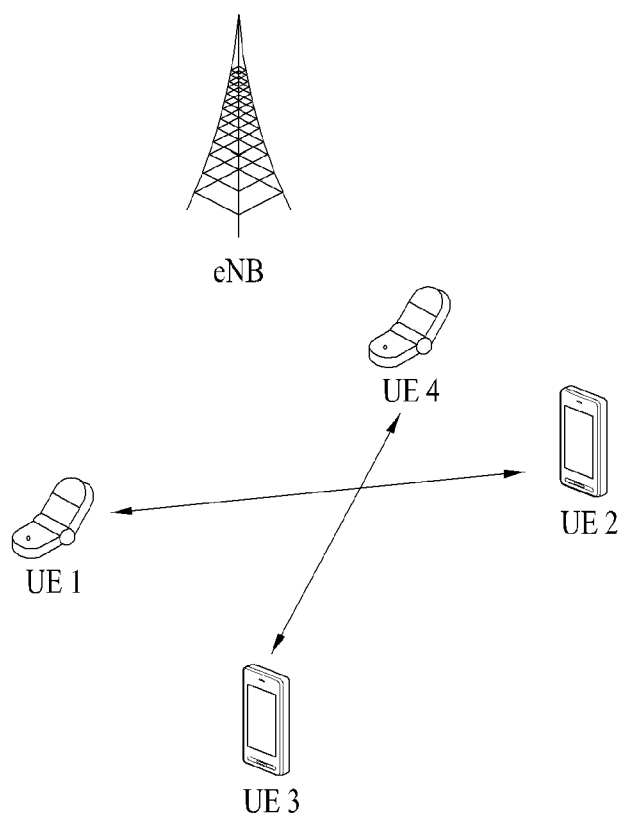
FIG. 8 is a conceptual diagram illustrating D2D direct communication.

FIG. 8 is a conceptual diagram illustrating D2D direct communication.

Referring to FIG. 8, UE 1 and UE 2 perform direct device-to-device communication and UE 3 and UE 4 perform direct device-to-device communication. An eNB can control positions of time/frequency resources and transmission power for direct device-to-device communication between UEs through appropriate control signals. However, when UEs are located outside of the coverage of the eNB, direct communication between the UEs can be performed without a control signal of the eNB. In the following description, direct device-to-device communication is referred to as D2D communication.

The present invention proposes a method for measuring a position of a counterpart UE or a distance between a UE and the counterpart UE using a D2D signal between the UE and the counterpart UE.

If the UE can detect the position of another UE or a distance between the UE and the other UE, the UE can provide a variety of useful services. For example, when the distance between the UE and the other UE can be detected and the other UE is located within a predetermined distance, the UE can provide a service of informing the user thereof of the location of the other UE and the distance between the UE and the other UE such that the user can recognize the user of the other UE. Furthermore, when a plurality of UEs transmits messages such as advertisements, the UE can receive only advertisement messages within a specific distance from the UE. In addition, it is possible to provide a service of monitoring presence of a UE, which has been registered as a UE in which the corresponding UIE is interested, within a specific distance or the distance between the corresponding UE and the interested UE and informing the user of the monitoring result.

As a technique of detecting position information of a UE in a wireless communication system, a method by which a UE receives signals transmitted from eNBs and detects the position thereof on the basis of the received signals has been proposed. According to this method, the UE detects the position thereof by measuring signals transmitted from eNBs, for example, positioning reference signals (PRSs) of 3GPP LTE and measuring arrival time of a signal transmitted from each eNB or a difference between arrival times of signals transmitted from two eNBs. More specifically, the UE can detect a difference between the distances between the UE and the two eNBs by measuring a difference between arrival times of signals transmitted from the two eNBs and can recognize that the UE is located at a point on a curve on which the distance difference between the two eNBs is uniform. When this process is repeated for other two eNBs, it is possible to obtain multiple curves on which the UE can be located and to recognize that the UE is located at a point where the curves meet. This operation requires position information of the eNBs, measured by the UE. However, since the corresponding network has already known the positions of the eNBs, the network can detect the positions of corresponding eNBs when the UE reports arrival times of signals transmitted from the eNBs or an arrival time difference between the transmitted signals to the network.

As another technique for detecting position information of a UE in a wireless communication system, a method by which an eNB receives a signal transmitted from the UE and the network detects the position of the UE on the basis of the received signal has been proposed. According to this method, the UE transmits a specific signal, for example, a sounding reference signal (SRS) of 3GPP LTE and a plurality of eNBs measures signal arrival time at each eNB or a difference between signal arrival times at two eNBs while receiving the signal transmitted from the UE. Then, the network can calculate the distance between each eNB and the UE or a difference between the distances between two eNBs and the UE on the basis of position information of each eNB, which has been provided to the network, and repeat this operation for multiple eNBs so as to recognize a commonly appearing point as the position of the UE.

The aforementioned operations are not suitable to be widely used when a UE detects the position of another UE.

Specifically, since the network finally detects the position of a UE in both methods, when a specific UE wants to use position information of another UE, the network needs to measure the position of the other UE through a series of operations with the other UE and then transmit the information about the position of the other UE to the specific UE. In this process, signaling overhead is generated between the network and UEs and, when the number of UEs increases, complexity of calculation of UE positions, performed by the network, remarkably increases. Particularly, when the UE requires information corresponding to partial information such as a distance between the UE and a target UE, rather than the correct position of the target UE, such signaling overhead or calculation complexity is more likely to cause unnecessary cost increase.

To solve this problem, the present invention proposes a method for measuring positions of UEs and a distance between UEs to minimize signaling overhead and calculation complexity in a network by transmitting and receiving a direct signal, that is, a signal using D2D communication between UEs.

The present invention assumes that each UE transmits a signal indicating presence thereof according to a predetermined rule. This signal is called a discovery signal (DS). UEs are designed such that a UE can recognize a UE, which has transmitted a specific DS, upon reception of the DS according to a DS transmission rule. For example, the DS can include identification information of the transmitting UE. The DS transmission rule includes a method of generating a DS by each UE and a method of generating time/frequency resources for transmitting the DS. In addition, the network can operate to broadcast the DS transmission rule such that UEs participating in DS transmission and reception can recognize the rule.

In the present invention, a UE assumes that there is a reference eNB for transmission time determination when transmitting a DS. Such an eNB is called a DS reference eNB. A UE may have a plurality of DS reference eNBs. For example, the UE can operate to transmit a DS using eNB1 as a DS reference eNB at time 1 and using eNB2 as a DS reference eNB at time 2. In the following description, a UE which intends to measure a position of another UE by receiving a DS is referred to as an operation UE and a UE whose position is to be measured by an operation UE is referred to as a target UE. That is, the operation UE measures a position of the target UE or a distance between the operation UE and the target UE by measuring a DS transmitted from the target UE. However, operations described in the present invention are not limited to a case in which the DS is used and are applicable to cases in which an arbitrary signal directly transmitted and received between UEs is used.

Figure 9:
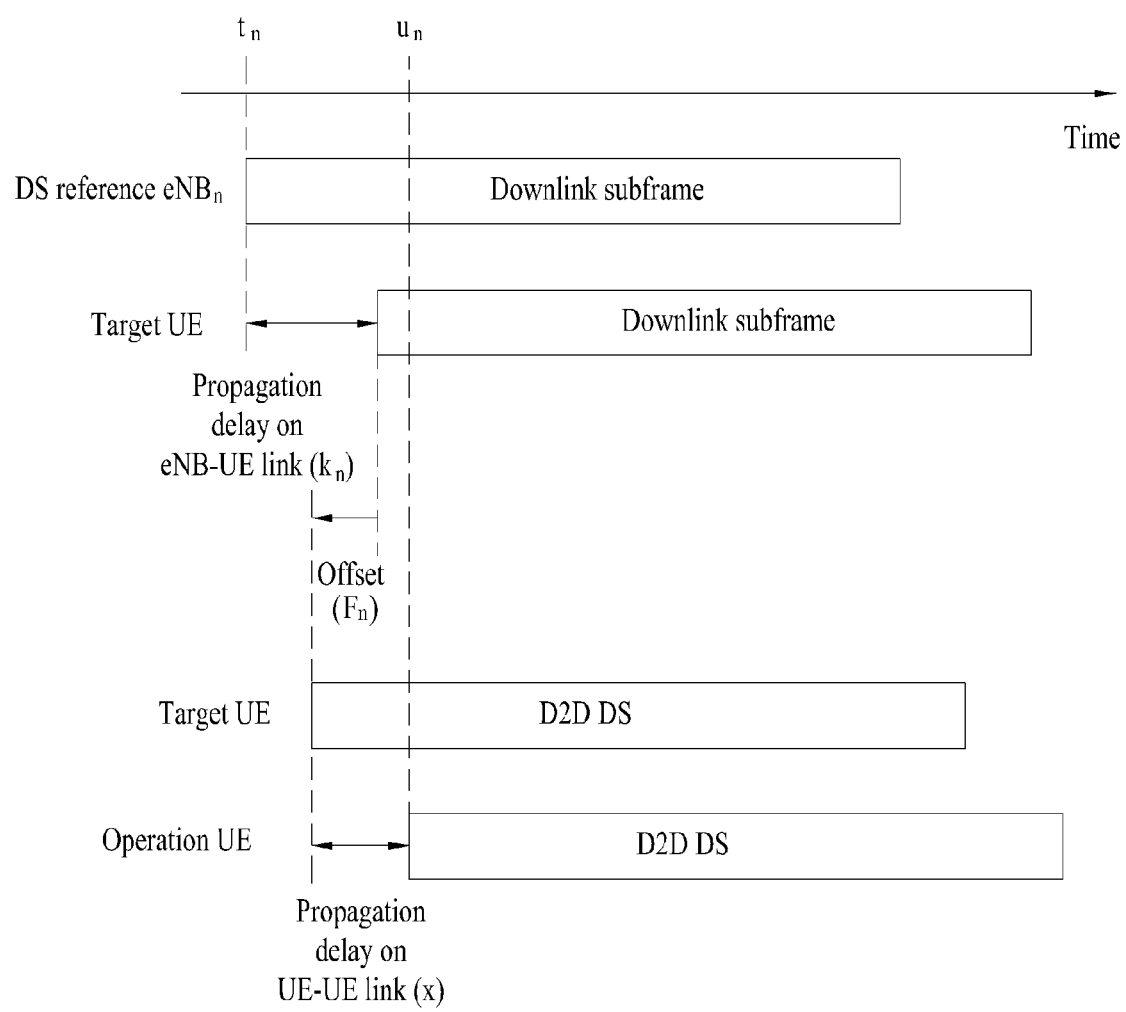
FIG. 9 illustrates timing of transmitting a DS by a target UE and timing of receiving the DS by an operation UE according to an embodiment of the present invention.

FIG. 9 illustrates timing of transmitting a DS by a target UE and timing of receiving the DS by an operation UE according to an embodiment of the present invention.

Referring to FIG. 9, when $eNB_n$ is provided as a DS reference eNB, the target UE determines a DS transmission time on the basis of timing of receiving a boundary of a downlink subframe from $eNB_n$. When $eNB_n$ has transmitted the downlink subframe boundary at time $t_n$ and propagation delay between $eNB_n$ and the target UE is $k_n$, the time of receiving, by the target UE, the downlink subframe boundary of $eNB_n$ is $t_n + k_n$. The target UE transmits a DS thereof a time $F_n$ in advance of the reception of the downlink subframe boundary of $eNB_n$. The value $F_n$ may be a previously fixed value or may be provided according to instruction of an eNB. When $F_n$ is provided according to instruction of the eNB, $F_n$ can be determined to be the same value as a timing advance (TA) value applied when the corresponding UE transmits a UL signal to the eNB. If $F_n$ is previously fixed, $F_n$ may be fixed to the same value for all DS reference eNBs.

The signal transmitted by the target UE at $t_n + k_n - F_n$ arrives at the operation UE at time $u_n = t_n + k_n - F_n + x$ through propagation delay x between the target UE and the operation UE. Propagation delay between the DS reference eNB, $eNB_n$, and the operation UE is assumed to be $d_n$.

A description will be given of a method of obtaining the upper limit and the lower limit of the distance between the operation UE and the target UE when a DS is transmitted through the aforementioned process.

Figure 10:
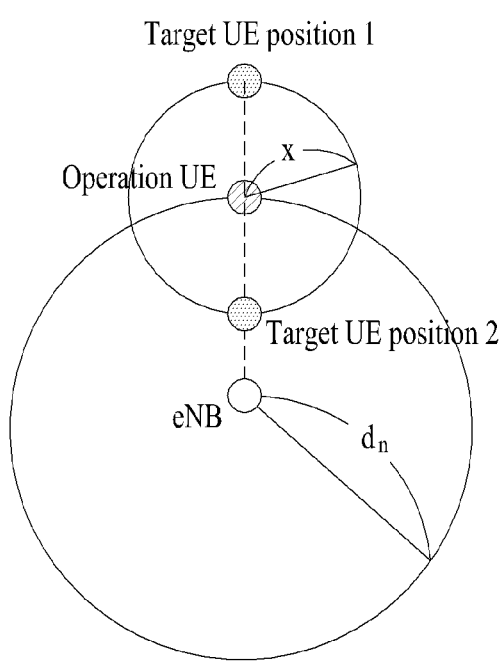
FIG. 10 illustrates areas in which the target UE can be located, which are calculated according to an embodiment of the present invention.

FIG. 10 illustrates areas in which the target UE can be located, which are calculated according to an embodiment of the present invention. In FIG. 10, it is assumed that $x \leq d_n$. Referring to FIG. 10, a maximum value and a minimum value of time of receiving a DS of the target UE by the operation UE respectively appear at target UE position 1 and target UE position 2.

When the target UE is located at position 1, Equation 1 can be established.

$$u_n \leq t_n + d_n + x - F_n + x - t_n + d_n - F_n + 2x \qquad \text{Equation [1]}$$

Conditions for x can be derived as represented by Equation 2 by rearranging Equation 1.

$$x ? ? u_n + F_n - t_n - d_n)/2 \qquad \text{Equation [2]}$$

When the target UE is located at position 2, conditions such as Equation 3 can be established. Particularly, the conditions are not related to x.

$$u_n \geq t_n + d_n - x - F_n + x = t_n + d_n - F_n \quad \text{Equation [3]}$$

Figure 11:
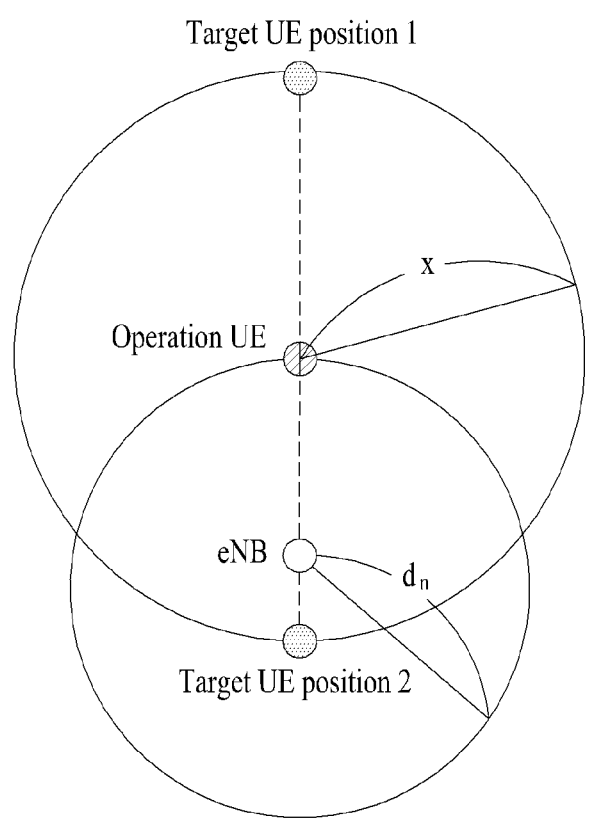
FIG. 11 illustrates areas in which the target UE can be located, which are calculated according to an embodiment of the present invention.

FIG. 11 illustrates areas in which the target UE can be located, which are calculated according to an embodiment of the present invention. In FIG. 11, it is assumed that $x > d_n$. Referring to FIG. 11, a maximum value and a minimum value of time of receiving a DS of the target UE by the operation UE respectively appear at target UE position 1 and target UE position 2.

When the target UE is located at position 1, conditions such as Equation 4 can be established.

$$u_n \leq t_n + d_n + x - F_n + x = t_n + d_n - F_n + 2x \quad \text{Equation [4]}$$

When the target UE is located at position 2, conditions such as Equation 5 can be established.

$$u_n \geq t_n + x - d_n - F_n + x = t_n - c_n - F_n + 2x \quad \text{[Equation 5]}$$

Conditions for x can be derived as represented by Equation 6 by arranging Equation 5.

$$x \geq ?? u_n + F_n - t_n + d_n)/2 \quad \text{[Equation 6]}$$

From Equation 2 and Equation 6, propagation delay x between the operation UE and the target UE satisfies conditions of Equation 7.

$$\frac{u_n + F_n - (t_n + d_n)}{2} \leq x \leq \frac{u_n + F_n - (t_n - d_n)}{2} \quad \text{[Equation 7]}$$

In Equation 7, $u_n$ can be measured by the operation UE since $u_n$ is the time of receiving, by the operation UE, the DS transmitted by the target UE and $(t_n + d_n)$ can also be measured since $(t_n + d_n)$ is the time of receiving a downlink subframe boundary of $eNB_n$ by the operation UE. $F_n$ is a value known to the operation UE if $F_n$ is a previously fixed value. If $F_n$ is a value indicated by the eNB to the target UE, the eNB can transmit the value to the operation UE or the target UE can directly inform the operation UE of the value. For example, $F_n$ can be transmitted using a field of the DS.

The operation UE can calculate $(t_n - d_n)$ by detecting $d_n$ on the basis of a measurement value of $(t_n + d_n)$. For example, the operation UE can attempt random access to the DS reference $eNB_n$ and regard a TA value signaled by $eNB_n$ as round trip delay (RTD) between the operation UE and $eNB_n$, that is, $2*d_n$.

A method for the target UE to directly inform the operation UE of the value $F_n$ will now be described in more detail. As described above, the target UE can transmit $F_n$ used thereby using a field of the DS transmitted thereby or a D2D signal. $F_n$ indicates an interval between a boundary of a downlink subframe received by the target UE which transmits a signal from the reference eNB and a time of transmitting a D2D signal, as described with reference to FIG. 9.

Here, it may be desirable to transmit a D2D signal including $F_n$ without applying $F_n$ thereto. This is because the operation UE receiving the D2D signal needs to attempt to detect the D2D signal in a very wide time region in order to receive the D2D signal to which $F_n$ has been applied while the operation UE is not aware of $F_n$. For example, the target UE can transmit the D2D signal to which $F_n$ is not applied, that is, transmit the D2D signal with $F_n$ fixed to 0 or a value previously known to the operation UE, and indicate $F_n$, which will be applied by the operation UE to D2D signal transmission, using a field of the D2D signal. The operation UE attempts to receive the D2D signal to which $F_n$ is not applied, on the basis of time ($u_n$ in FIG. 9) corresponding to a boundary of a downlink subframe received from the reference eNB, extracts $F_n$ from a detected signal and then considers that $F_n$ has been applied to the D2D signal.

Figure 12:
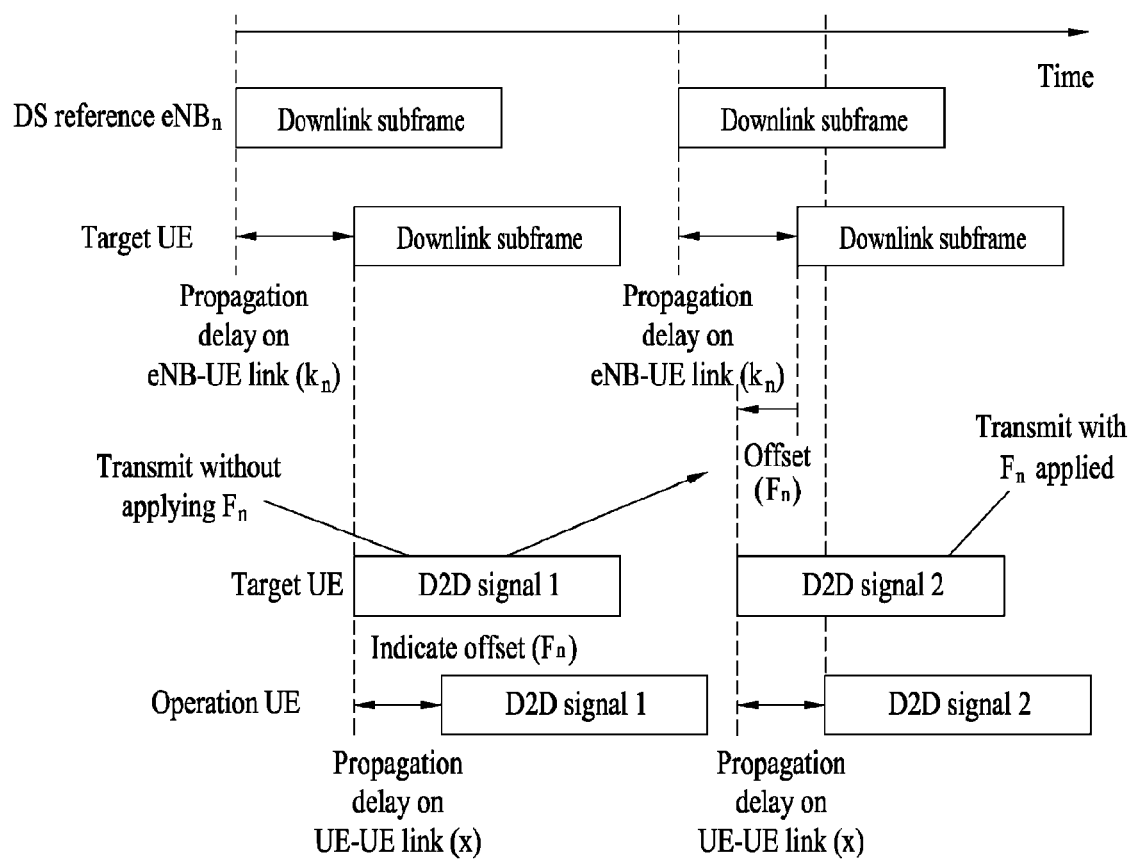
FIG. 12 illustrates an example of transmitting and receiving a signal using direct device-to-device communication, that is, a D2D signal, according to an embodiment of the present invention.

FIG. 12 illustrates an example of transmitting and receiving a signal using D2D, that is, a D2D signal according to an embodiment of the present invention. Referring to FIG. 12, the target UE can transmit D2D signal #1 including $F_n$ without applying $F_n$ thereto and then transmit D2D signal #2 by applying $F_n$ thereto.

The operation UE can detect the upper limit and the lower limit of propagation delay x between the operation UE and the target UE, as described above. The detected upper limit and lower limit may have different values for DS reference eNBs. Accordingly, the operation UE can further narrow the range of areas in which x is present by calculating the upper limit and the lower limit of x for each DS reference eNB and then obtaining the intersection of calculated areas of x. When information about propagation delay x between the operation UE and the target UE is obtained, propagation delay x can be converted into the distance between the operation UE and the target UE by multiplying propagation delay x by electromagnetic wave propagation speed.

A description will be given of a method for measuring the position of the target UE using position information of a DS reference eNB and DS reception time.

Since $u_n = t_n + k_n - F_n + x$, as described above with reference to FIG. 9, reception of DSs transmitted from two points at the same time means that values $k_n + x$ calculated from the two points have the same value from the viewpoint of the operation UE. This will be described with reference to the attached drawings.

Figure 13:
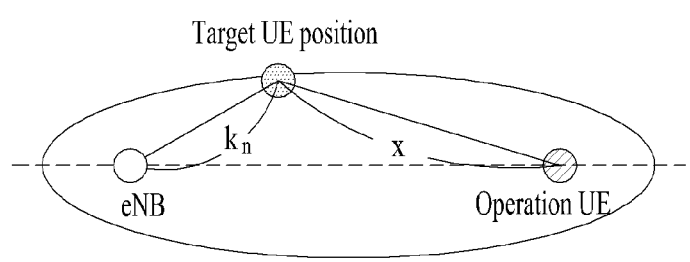
FIG. 13 illustrates an exemplary method for detecting the position of the target UE according to an embodiment of the present invention.

FIG. 13 illustrates a method for detecting the position of the target UE according to an embodiment of the present invention.

Referring to FIG. 13, since $k_n + x$ indicates propagation delay of a signal transmitted from the DS reference $eNB_n$ to the operation UE via the target UE, the position of the target UE, which generates the same $u_n$, appears in the form of an ellipse having the positions of the DS reference $eNB_n$ and the operation UE as focus points. That is, when the operation UE measures $u_n$ and calculates $k_n + x$ on the basis of $u_n$, the operation UE can generate one ellipse and recognize that the target UE is located at a point on the ellipse.

Figure 14:
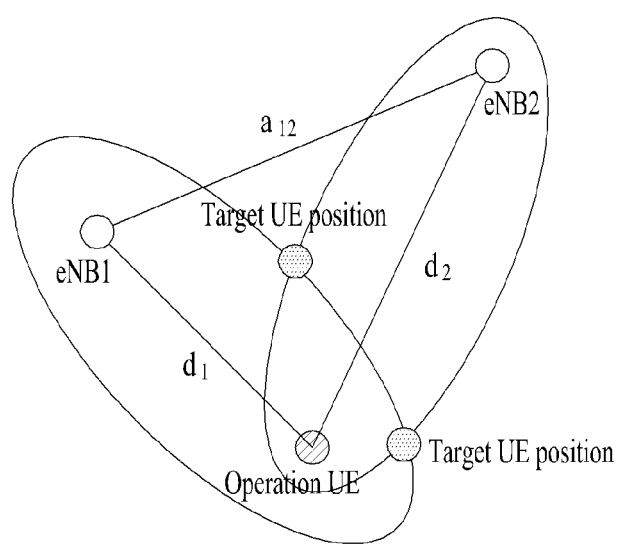
FIG. 14 illustrates another exemplary method for detecting the position of the target UE according to an embodiment of the present invention.

FIG. 14 illustrates a method for detecting the position of the target UE according to another embodiment of the present invention. Particularly, FIG. 14 corresponds to a case in which ellipses are formed for two DS reference eNBs and location of the target UE at intersections of the two ellipses is detected according to the principle described with reference to FIG. 13.

Figure 15:
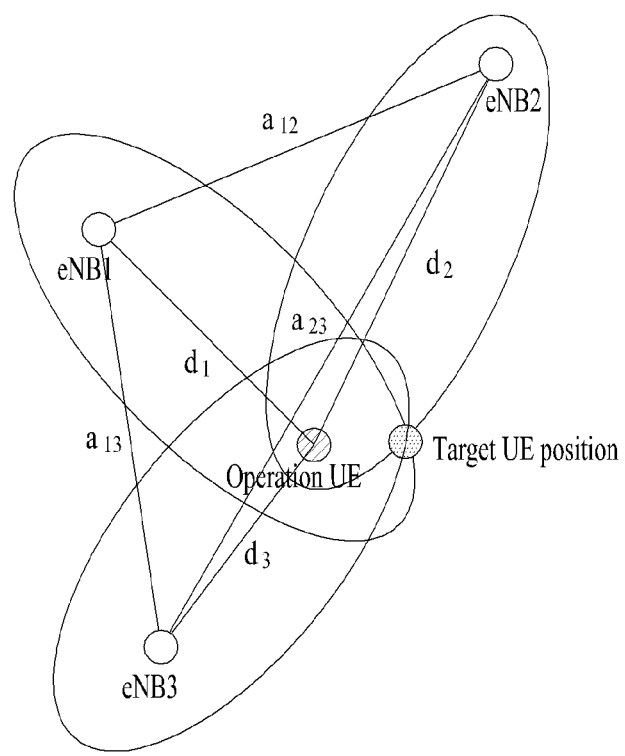
FIG. 15 illustrates another exemplary method for detecting the position of the target UE according to an embodiment of the present invention.

FIG. 15 illustrates a method for detecting the position of the target UE according to another embodiment of the present invention. Particularly, FIG. 15 corresponds to a case in which the aforementioned operation is repeated for three DS reference eNBs. Since there is a single intersection of three ellipses, the position of the target UE can be fixed to one position.

As described above, the position of the target UE can be detected by forming ellipses on which the target UE can be located for two or more DS reference eNBs. To this end, the operation UE requires information about the position of each DS reference eNB. This information can be previously signaled by the network to the UE through a method such as broadcast.

Position information of a DS reference eNB can be represented as an absolute coordinate such as the longitude and latitude of each eNB. In this case, the operation UE can detect the absolute coordinate of the target UE. When the absolute coordinate is not needed, such as a case in which the distance between the target UE and the operation UE is measured, only relative position is required. For example, only information about a distance between DS reference eNBs can be provided to the operation UE.

Referring to FIG. 15, since $a_{nm}$, indicates the distance between DS reference $eNB_n$ and DS reference $eNB_m$, the relative position of each eNB can be detected when the target UE obtains the distance information. Even in this method, the operation UE needs to detect a distance from each DS reference eNB. In this case, the operation UE may detect the distance from TA obtained in a random access procedure or from a signal (e.g. a PRS) transmitted by each DS reference eNB.

If the operation UE can be aware of the distance between the target UE and a DS reference eNB, the operation UE can easily measure the distance to the target UE or detect the position of the target UE. For example, it is assumed that the network notifies the operation UE of the distance between the target UE and a specific DS reference eNB or the target UE notifies the operation UE of the distance between the target UE and the specific DS reference eNB using D2D communication, for example, using some bits of a DS.

When $F_n$ used for the target UE to transmit a D2D signal is set to the same value as a TA value used for uplink signal transmission and is transmitted to the operation UE through a signal directly transmitted and received between UEs, the operation UE can recognize the distance between the target UE and the DS reference eNB through $F_n$. This is because a TA value of a specific UE is conventionally set to a value corresponding to twice propagation delay between the UE and a reference eNB. That is, the operation UE can consider that a value obtained by dividing $F_n$ signaled by the target UE in half corresponds to propagation delay between the target UE and the reference eNB.

Figure 16:
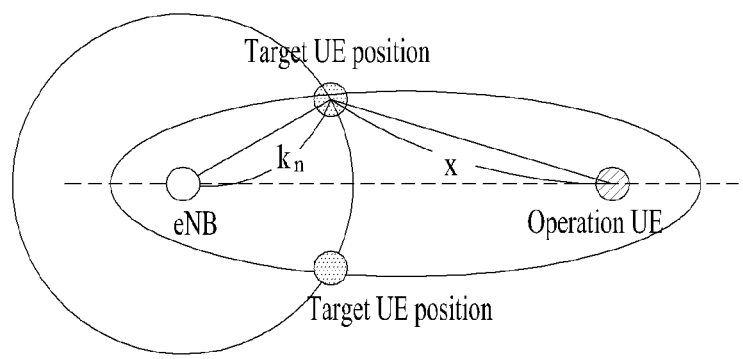
FIG. 16 illustrates an example of reducing the number of candidate positions of the target UE by adding a circle corresponding to a distance between a corresponding DS reference eNB and the target UE according to an embodiment of the present invention.

Then, the operation UE can detect candidate positions of the target UE from a DS transmitted from the target UE on the basis of the corresponding DS reference eNB and reduce the number of candidate positions of the target UE by adding a circle corresponding to the distance between the DS reference eNB and the target UE thereto. FIG. 16 illustrates an example of reducing the number of candidate positions of the target UE by adding a circle corresponding to the distance between the DS reference eNB and the target UE according to an embodiment of the present invention.

A description will be given of a method for measuring the position of the target UE or a distance to the target UE using a DS reception time difference.

Since $u_n=t_n+k_n-F_n+x$, as described in FIG. 9, when the operation UE measures $u_n$ and $u_m$ for DSs, which have been transmitted by the target UE for two DS reference eNBs, $eNB_n$ and $eNB_m$, the operation UE can detect the distances between the target UE and the two DS reference eNBs using a difference between the two values. Specifically, $u_n-u_m=t_n-t_m+k_n-k_m-F_n+F_m$ and a common element, the distance x between the target UE and the operation UE, has disappeared therefrom. The operation UE recognizes $F_n$ and $F_m$, as described above, or these two values may be identical for operation convenience. In this case, the two components disappear.

Information $t_n$ and $t_m$ can be derived from information about time when the target UE transmits a DS on the basis of each DS reference eNB (e.g. radio frame and subframe index), and DS reference eNBs may be assumed to be synchronized in a predetermined unit of time (e.g., 1 ms constituting a subframe). That is, when it is assumed that two DS reference eNBs have been synchronized in 1 ms, the operation UE can assume that boundaries of downlink subframes transmitted by the two DS reference eNBs correspond to the same time.

According to this operation, the operation UE can calculate $k_n-k_m$ corresponding to a difference between the distances between the target UE and the DS reference eNBs from $u_n-u_m$.

Figure 17:
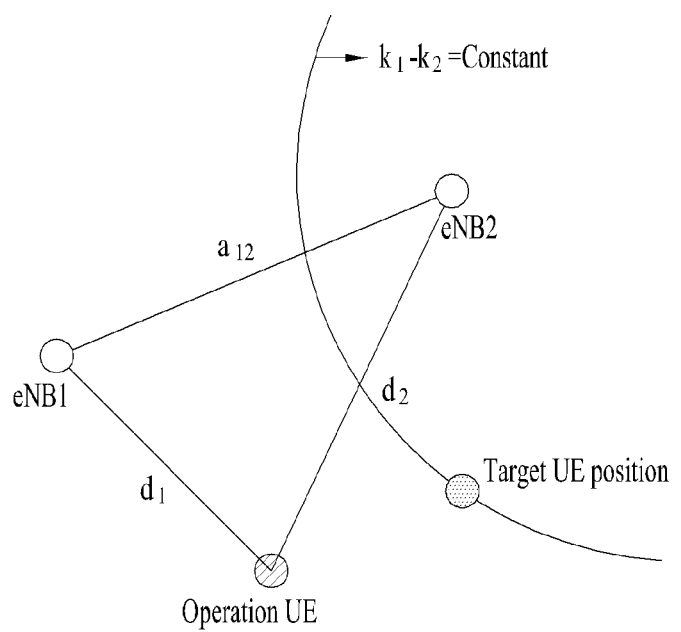
FIG. 17 illustrates an example of measuring the position of the target UE or a distance to the target UE using a DS signal reception time difference according to an embodiment of the present invention.

FIG. 17 illustrates an example of measuring the position of the target UE or a distance to the target UE using a DS signal reception time difference according to an embodiment of the present invention.

Referring to FIG. 17, a curve indicating candidate positions of the target UE is formed on the basis of position information of two DS reference eNBs. Here, the curve is represented by a set of points at which a difference between the distances from the two DS reference eNBs is uniform. When this operation is performed for two other eNB s, another curve can be formed and the intersection of the two curves corresponds to the position of the target UE.

Figure 18:
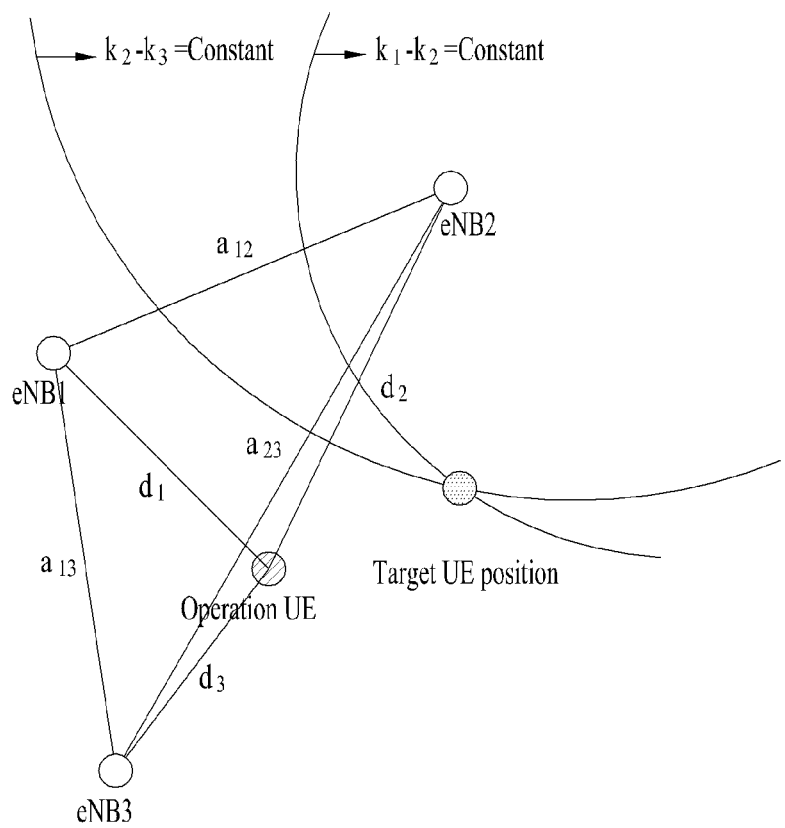
FIG. 18 illustrates another example of measuring the position of the target UE or a distance to the target UE using a DS signal reception time difference according to an embodiment of the present invention.

FIG. 18 illustrates another example of measuring the position of the target UE or a distance to the target UE using a DS signal reception time difference according to an embodiment of the present invention. Particularly, FIG. 18 corresponds to a case in which distance measurement illustrated in FIG. 17 is additionally performed for eNB2 and eNB3.

In FIGS. 17 and 18, the operation UE needs to detect a distance to each DS reference eNB. The operation UE may detect the distance from TA obtained in a random access procedure or from a signal (e.g., a PRS) transmitted by each DS reference eNB, as described above.

Figure 19:
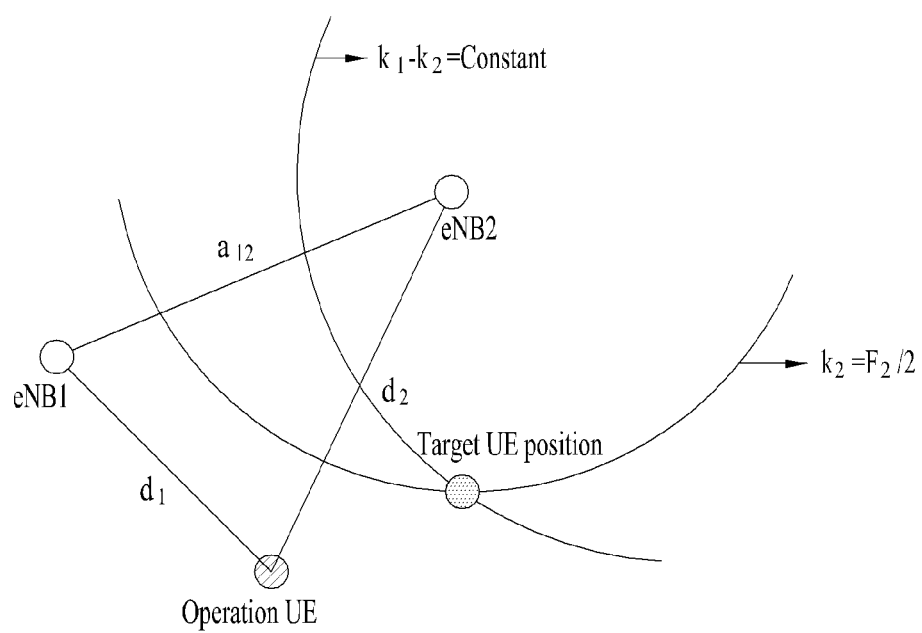
FIG. 19 illustrates an example of measuring a distance to the target UE by detecting a distance between each reference eNB and the target UE according to an embodiment of the present invention.

When it is assumed that the operation UE directly receives $F_n$ and $F_m$, from the target UE and detects the distance between the target UE and each DS reference eNB on the basis of $F_n$, and $F_m$, it is possible to measure the distance between the target UE and each DS reference eNB. The candidate positions of the target UE, obtained through the method shown in FIG. 17, may be additionally narrowed using information about the distance between each reference eNB and the target UE. FIG. 19 illustrates an example of measuring a distance to the target UE by detecting the distance between each reference eNB and the target UE according to an embodiment of the present invention.

To acquire TA values with respect to respective reference eNBs and to respectively transmit the TA values through D2D signals, the target UE needs to attempt to access multiple eNBs. This may remarkably increase complexity and overhead. In this case, the same value $F_n$ as a TA value applied to uplink transmission may be used when a D2D signal is transmitted in the case of synchronization with a small number of reference eNBs, whereas a previously fixed value, that is, 0 or a fixed value previously recognized by the operation UE, may be set to $F_n$ in the case of synchronization with other reference eNBs. For example, $F_n$ can be set to the TA value applied to uplink transmission in the case of synchronization with a serving cell of the target UE and set to 0 in the case of synchronization with other eNBs. When $F_n$ is transmitted, whether $F_n$ is identical to the TA value applied to uplink transmission can be signaled.

To perform the aforementioned operations, the operation UE needs to recognize which eNB is presumed by the target UE as a DS reference eNB and when the target UE transmits a DS. Such information can be transmitted by the network to the operation UE.

The operation UE can calculate the position of the target UE according to the aforementioned methods. To this end, the network may provide position information of DS reference eNBs to the operation UE and the operation UE may directly calculate the position of the target UE on the basis of the position information of the DS reference eNBs. Alternatively, for simplification of the operation UE, the operation UE may measure reception time of a target UE DS corresponding to each DS reference eNB or a target UE DS reception time difference for a specific DS reference eNB combination and report the measurement result to the network such that the network can detect the position of the target UE. Particularly, the latter is applicable when the network intends to detect the position of the target UE through the operation UE when the target UE has no position detection capability.

Figure 20:
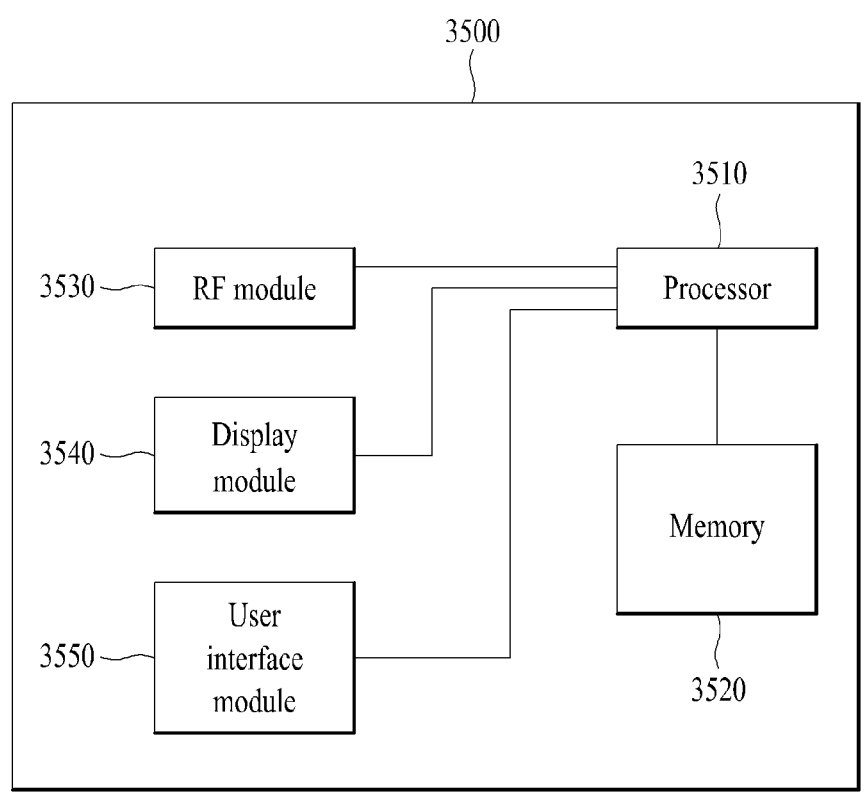
FIG. 20 is a block diagram illustrating a communication device according to embodiments of the present invention.

FIG. 20 is a block diagram illustrating a communication device according to embodiments of the present invention.

In FIG. 20, the communication device 2000 includes a processor 2010, a memory 2020, a Radio Frequency (RF) module 2030, a display module 2040, and a user interface (UI) module 2050.

The communication device 2000 is disclosed for illustrative purposes only and certain modules may also be omitted from the communication device 2000 as necessary. In addition, the communication device 2000 may further include necessary modules. Some modules of the communication device 2000 may be identified as more detailed modules. The processor 2010 is configured to carry out the operations of the embodiments of the present invention. For detailed operations of the processor 2010 reference may be made to FIGS. 1 to 19.

The memory 2020 is connected to the processor 2010, and stores an operating system, applications, program code, data and the like. The RF module 2030 is connected to the processor 2010 and converts a baseband signal into a radio frequency (RF) signal, or converts the RF signal into the baseband signal. For these operations, the RF module 2030 performs analog conversion, amplification, filtering, and frequency up-conversion in order or performs such operations in reverse order. The display module 2040 is connected to the processor 2010 and displays a variety of information. The scope or spirit of the display module 2040 of the present invention is not limited thereto, and the display module 2040 may be any of well-known elements, for example, a Liquid Crystal Display (LCD), a Light Emitting Diode (LED), an Organic Light Emitting Diode (OLED) and the like. The user interface (UI) module 1450 is connected to the processor 2010, and may be implemented as a combination of user interfaces such as a keypad, a touchscreen, etc.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

While the aforementioned method for transmitting and receiving a synchronization signal for D2D communication in a wireless communication system and the apparatus for the same have been described on the basis of 3GPP LTE, the present invention is applicable to various wireless communication systems other than 3GPP LTE.

The invention claimed is:

1. A method of transmitting signals via a device-to-device (D2D) link at a user equipment (UE) in a wireless communication system, the method comprising:
    transmitting, to a target UE, a control signal for the D2D link including a timing adjustment value for the D2D link based on a reference timing, without applying the timing adjustment value;
    transmitting a data signal for the D2D link to the target UE, with the timing adjustment value applied,
    wherein the timing adjustment value for the D2D link is the same as a timing adjustment value for an uplink to a base station (BS).

2. The method according to claim 1, further comprising:
    receiving information about the timing adjustment value for the uplink from the BS.

3. The method according to claim 1, wherein the reference timing is a downlink reception timing from the BS.

4. The method according to claim 3, wherein applying the timing adjustment value comprises adjusting a D2D link transmission timing based on the downlink reception timing by the timing adjustment value.

5. The method according to claim 4, wherein the downlink reception timing is delayed from a downlink transmission timing.

6. The method according to claim 3, wherein a transmission timing of the control signal for the D2D link is aligned to the downlink reception timing.

7. A user equipment (UE) in a wireless communication system, the UE comprising:
 a radio frequency (RF) communication module that transmits/receives signals to/from a base station (BS) via uplink/downlink or to/from a target UE via a device-to-device (D2D) link; and
 a processor that:
 controls the RF communication module to transmit a control signal for the D2D link including a timing adjustment value for the D2D link based on a reference timing without applying the timing adjustment value to the target UE, and to transmit a data signal for the D2D link to the target UE with the timing adjustment value applied,
 wherein the timing adjustment value for the D2D link is the same as a timing adjustment value for the uplink.

8. The UE according to claim 7, wherein the processor controls the RF communication module to receive information about the timing adjustment value for the uplink from the BS.

9. The UE according to claim 7, wherein the reference timing is a downlink reception timing from the BS.

10. The UE according to claim 9, wherein the processor adjusts a D2D link transmission timing based on the downlink reception timing by the timing adjustment value when applying the timing adjustment value.

11. The UE according to claim 9, wherein the processor aligns a transmission timing of the control signal for the D2D link to the downlink reception timing.

12. The UE according to claim 11, wherein the downlink reception timing is delayed from a downlink transmission timing.

* * * * *